United States Patent
Watabe (10) Patent No.: US 8,063,756 B2
(45) Date of Patent: Nov. 22, 2011

(54) TIRE PRESSURE MONITOR HAVING CAPABILITY OF ACCURATELY DETECTING STATE OF MOTION OF VEHICLE

(75) Inventor: Nobuya Watabe, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 803 days.

(21) Appl. No.: 11/826,269

(22) Filed: Jul. 13, 2007

(65) Prior Publication Data
US 2008/0030314 A1 Feb. 7, 2008

(30) Foreign Application Priority Data
Aug. 1, 2006 (JP) ................. 2006-209629

(51) Int. Cl.
*B60C 23/00* (2006.01)
(52) U.S. Cl. ........ 340/447; 340/442; 340/445; 340/438; 340/444; 73/146.2; 116/34 R
(58) Field of Classification Search .............. 340/438, 340/442, 444, 445, 447; 73/146.2; 116/34 R
See application file for complete search history.

(56) References Cited

U.S. PATENT DOCUMENTS

| 4,876,528 A * | 10/1989 | Walker et al. ............ 340/442 |
| 6,232,875 B1 | 5/2001 | DeZorzi |
| 2003/0074116 A1 * | 4/2003 | Winner et al. ............ 701/29 |
| 2004/0021562 A1 * | 2/2004 | Prenninger ............ 340/445 |
| 2004/0212487 A1 * | 10/2004 | Yagi et al. ............ 340/445 |
| 2004/0217854 A1 * | 11/2004 | Hirohama et al. ............ 340/445 |
| 2006/0243041 A1 | 11/2006 | Shimura |
| 2008/0264161 A1 * | 10/2008 | Spiess ............ 73/146.2 |

FOREIGN PATENT DOCUMENTS

| JP | 11-20427 | 1/1999 |
| JP | 2002-264618 | 9/2002 |
| JP | 2004-189148 | 7/2004 |

* cited by examiner

*Primary Examiner* — George Bugg
*Assistant Examiner* — Ojiako Nwugo
(74) *Attorney, Agent, or Firm* — Nixon & Vanderhye PC (57) ABSTRACT

A tire pressure monitor provided on a wheel of a vehicle includes a pressure sensor, a transmitter, an acceleration sensor, and a controller. The pressure sensor works to output a pressure signal representative of the inflation pressure of a tire fitted on the wheel. The transmitter works to transmit the pressure signal. The acceleration sensor works to output an acceleration signal representative of a centrifugal acceleration which increases with the running speed of the vehicle. The controller is configured to: 1) determine a change in the centrifugal acceleration for a predetermined time period based on the acceleration signal, 2) determine the vehicle as being in running state when the determined change is greater than or equal to a predetermined threshold, and 3) control the transmitter to transmit the pressure signal when the vehicle is determined as being in running state.

18 Claims, 8 Drawing Sheets

TIRE PRESSURE MONITOR HAVING CAPABILITY OF ACCURATELY DETECTING STATE OF MOTION OF VEHICLE

CROSS-REFERENCE TO RELATED APPLICATION

This application is based on and claims priority from Japanese Patent Application No. 2006-209629, filed on Aug. 1, 2006, the content of which is hereby incorporated by reference into this application.

BACKGROUND OF THE INVENTION

1. Technical Field of the Invention

The present invention relates generally to tire pressure monitoring systems. More particularly, the invention relates to a tire pressure monitor, which can accurately detect the state of motion of a vehicle and transmit a pressure signal representative of the inflation pressure of a tire on the vehicle according to the detected state of motion, and a tire pressure monitoring system including a plurality of such tire pressure monitors.

2. Description of the Related Art

Conventional direct-type tire pressure monitoring systems generally include at least one tire pressure monitor and a central monitor.

The tire pressure monitor is directly installed to a wheel of a vehicle and includes a pressure sensor working to sense inflation pressure of a tire fitted on the wheel. The tire pressure monitor is configured to transmit a pressure signal indicative of the inflation pressure of the tire sensed by the pressure sensor.

The central monitor is installed to the body of the vehicle and includes at least one antenna. The central monitor is configured to receive, via the antenna, the pressure signal transmitted from the tire pressure monitor and determine the inflation pressure of the tire based on the received pressure signal.

Japanese Patent First Publication No. 2002-264618 discloses a tire pressure monitor (or tire pressure sensor) for use in a direct-type tire pressure monitoring system. The tire pressure monitor includes an acceleration sensor for detecting the state of motion of the vehicle and is configured to transmit the pressure signal according to the detected state of motion.

More specifically, the acceleration sensor includes a fixed electrode and a movable electrode opposed to the fixed electrode. The acceleration sensor is configured to sense a centrifugal acceleration through detecting a change in the electric capacitance between the fixed and movable electrodes; the change is caused by a displacement of the movable contact due to the centrifugal acceleration which increases with the running speed of the vehicle. The tire pressure monitor is configured to determine the state of motion of the vehicle based on the centrifugal acceleration sensed by the acceleration sensor and transmit the pressure signal according to the determined state of motion. For example, the tire pressure monitor may be configured to transmit the pressure signal only when the vehicle is in running state, thereby reducing the electric power consumption of the tire pressure monitor.

Moreover, the determination as to whether the vehicle is in running or stop state can be made through determining whether the centrifugal acceleration sensed by the acceleration sensor exceeds a predetermined threshold. However, the sensing accuracy of the acceleration sensor is usually influenced by the temperature characteristic and aged deterioration of the acceleration sensor; thus, in some cases, it is difficult to accurately determine whether the vehicle is in running or stop state when the vehicle is running at a low speed.

Figure 9:
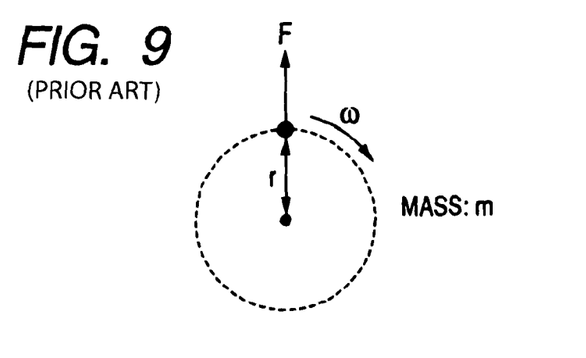
FIG. 9 is a schematic view illustrating a centrifugal force.

More specifically, since the tire pressure monitor is mounted on the wheel, it rotates with the wheel and thus receives a centrifugal force during the rotation. Referring to FIG. 9, the centrifugal force is an inertia force which has a radially outward direction and a magnitude F that can be determined by the following equation:

$$F = m \times r \times \omega^2 \quad \text{(Equation 1)}$$

where, m is the mass, r is the rotating-radius, and $\omega$ is the angular rate of the tire pressure monitor.

Accordingly, the acceleration sensor of the tire pressure monitor senses the centrifugal acceleration G which is equal to $r \times \omega^2$. Further, since the angular rate $\omega$ increases with the running speed V of the vehicle, the centrifugal acceleration G has the following relationship with the running speed V:

$$G = A \times R \times V^2 \quad \text{(Equation 2)}$$

where, R is the radius of the wheel, and A is a constant which depends on the type of the wheel and the mounting position of the tire pressure monitor on the wheel.

Figure 10:
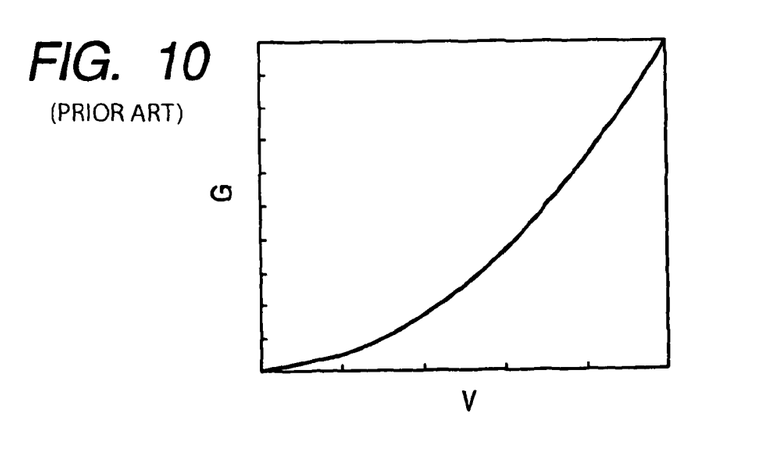
FIG. 10 is a graphical representation illustrating the relationship between a centrifugal acceleration and the running speed of a vehicle.

As shown in FIG. 10, the centrifugal acceleration G exponentially increases with respect to the running speed V of the vehicle. Accordingly, it is possible to determine the running state of the vehicle based on the centrifugal acceleration G sensed by the acceleration sensor.

Figure 11:
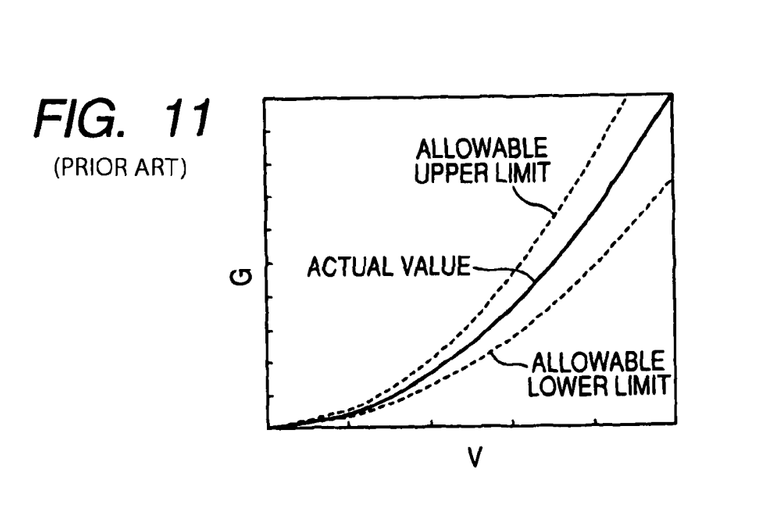
FIG. 11 is a graphical representation illustrating the accuracy tolerance of an acceleration sensor.

However, when the acceleration sensor is configured with a low-cost acceleration sensor which has an accuracy tolerance of $\pm\alpha\%$, there will be upper and lower allowable limits of error as shown in FIG. 11.

Figure 12:
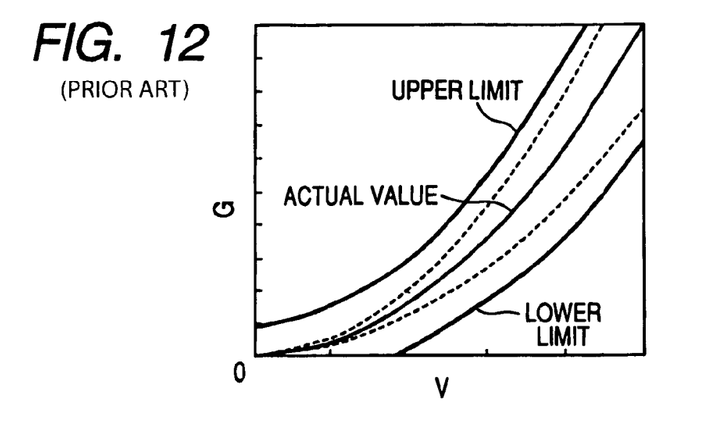
FIG. 12 is a graphical representation illustrating the sensing error range of the acceleration sensor.

Further, considering the sensing error caused by the aged deterioration of the acceleration sensor, which is in the range of $\pm\beta(G)$, the sensed centrifugal acceleration may deviate from the actual centrifugal acceleration within the range between upper and lower limits of error as shown in FIG. 12.

Consequently, due to the deviation of the sensed centrifugal acceleration from the actual one, it is difficult to suitably predetermine the threshold for determination of the state of motion of the vehicle.

For example, to detect running state of the vehicle even when the vehicle is running at a low speed, it is desirable to set the threshold as low as possible. However, when the threshold is set so as to be lower than Gr shown in FIG. 13, the vehicle may be determined as being in running state, though it is actually in stop state, due to the sensing error of the acceleration sensor. Thus, the pressure signal may be transmitted even when the vehicle is in stop state, thereby increasing the power consumption of the tire pressure monitor.

Figure 13:
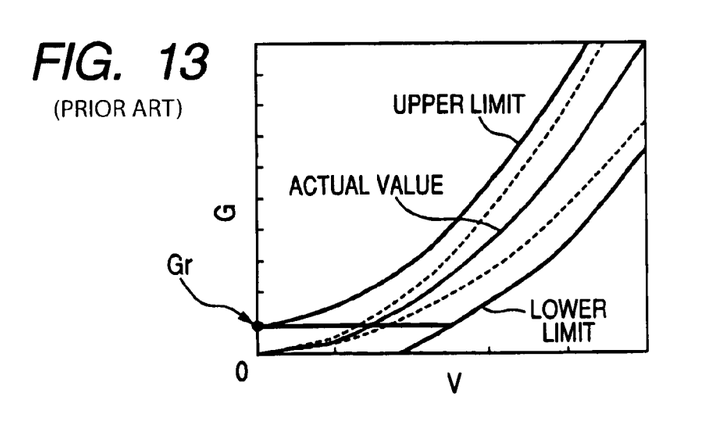
FIG. 13 is a graphical representation illustrating a difficulty in predetermining a centrifugal acceleration threshold.
Figure 14:
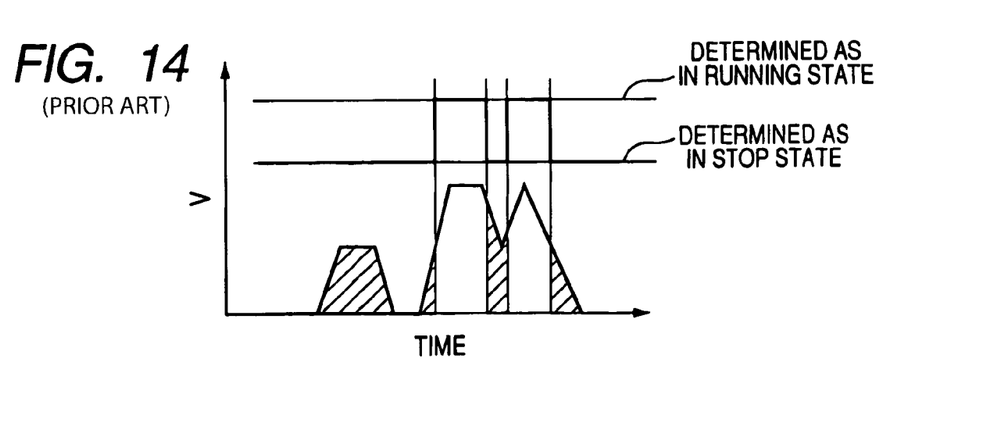
FIG. 14 is a time chart illustrating an example of inaccurate determination of the state of motion of a vehicle.

On the contrary, when the threshold is set so as to be higher than Gr shown in FIG. 13, the vehicle may not be determined as being in running state unless it is running at a considerably high speed. Thus, when the sensed centrifugal acceleration deviates from the actual one toward the lower limit of error, the vehicle may be determined as being in stop state though it is actually running at a low speed. FIG. 14 illustrates an example of such incorrect determination, wherein the hatched zones represent the time periods for which the vehicle is determined as being in stop state though it is actually in running state.

SUMMARY OF THE INVENTION

The present invention has been made in view of the above-mentioned problems.

It is, therefore, an object of the present invention to provide a tire pressure monitor which can accurately determine the state of motion of the vehicle using an acceleration sensor and transmit the pressure signal according to the state of motion of vehicle.

It is a further object of the present invention to provide a tire pressure monitoring system which includes such a tire pressure monitor.

According to a first aspect of the present invention, a tire pressure monitor is provided on a wheel of a vehicle to monitor inflation pressure of a tire fitted on the wheel. The tire pressure monitor includes a pressure sensor, a transmitter, an acceleration sensor, and a controller.

The pressure sensor works to sense the inflation pressure of the tire and output a pressure signal representative of the sensed inflation pressure.

The transmitter works to transmit the pressure signal output from the pressure sensor.

The acceleration sensor works to sense a centrifugal acceleration, which increases with running speed of the vehicle, and output an acceleration signal representative of the sensed centrifugal acceleration.

The controller works to determine the state of motion of the vehicle and control the transmitter to transmit the pressure signal according to the determined state of motion. The controller is configured to: 1) determine a change in the centrifugal acceleration for a predetermined time period based on the acceleration signal output from the acceleration sensor, 2) determine the vehicle as being in running state when the determined change is greater than or equal to a predetermined threshold, and 3) control the transmitter to transmit the pressure signal when the vehicle is determined as being in running state.

With the above configuration, since the centrifugal acceleration definitely changes with the running speed of the vehicle, it is possible for the controller to accurately determine, based on the change in the centrifugal acceleration, the state of motion of the vehicle even when the vehicle starts running at low speeds.

Consequently, the pressure signal can be reliably transmitted according to the state of motion of the vehicle, thereby effectively decreasing the electric power consumption of the tire pressure monitor.

According to an embodiment of the invention, the controller is further configured to: 1) determine the vehicle as being in stop state when the change in the centrifugal acceleration is less than or equal to a predetermined tolerance which is less than the predetermined threshold, and 2) control the transmitter to refrain from transmitting the pressure signal when the vehicle is determined as being in stop state.

The tire pressure monitor further includes a memory storing therein a state parameter indicative of the state of motion of the vehicle. The controller is further configured to repeat determination of the state of motion of the vehicle and update the state parameter in the memory based on the result of each the determination. When the change in the centrifugal acceleration is less than the predetermined threshold and greater than the predetermined tolerance, the controller refrains from newly determining the state of motion of the vehicle and keeps the state parameter unchanged.

Moreover, the memory preferably is a nonvolatile memory.

According to another embodiment of the invention, the tire pressure monitor further includes a temperature sensor that works to sense temperature of air within the tire and output a temperature signal representative of the sensed temperature. The controller is further configured to: 1) determine the temperature of air within the tire based on the temperature signal output from the temperature sensor, and 2) determine, prior to determining the state of motion of the vehicle based on the change in the centrifugal acceleration, the vehicle as being in running state when the determined temperature is higher than or equal to a predetermined temperature threshold.

According to yet another embodiment of the invention, in the tire pressure monitor, the controller is further configured to: 1) determine the centrifugal acceleration based on the acceleration signal output from the acceleration sensor, and 2) determine, prior to determining the state of motion of the vehicle based on the change in the centrifugal acceleration, the vehicle as being in running state when the determined centrifugal acceleration is higher than or equal to a predetermined acceleration threshold.

According to still another embodiment of the invention, the tire pressure monitor further includes a nonvolatile memory storing therein a deviation of the acceleration sensor. The controller is further configured to: 1) correct the determined change in the centrifugal acceleration using deviation of the acceleration sensor, and 2) determine the state of motion of the vehicle based on the corrected change in the centrifugal acceleration.

Moreover, when the vehicle is determined as being in stop state, the controller sets the deviation of the acceleration sensor to a present value of the centrifugal acceleration.

According to still yet another embodiment of invention, in the tire pressure monitor, the controller is further configured to: 1) determine the vehicle as being in brief-stop state when the change in the centrifugal acceleration is less than or equal to a first predetermined tolerance which is less than the predetermined threshold, 2) determine, when the vehicle is determined as being in brief-stop state, a second change in the centrifugal acceleration for a second predetermined time period based on the acceleration signal output from the acceleration sensor, the second predetermined time period being longer than the first predetermined time period, 3) further determine the vehicle as being in parking state when the second change is less than or equal to a second predetermined tolerance which is less than the first predetermined tolerance, as being in running state when the second change is greater than or equal to the predetermined threshold, and as being in brief-stop state when the second change is greater than the second predetermined tolerance and less than the predetermined threshold, and 4) control the transmitter to cyclically transmit the pressure signal at first predetermined time intervals when the vehicle is determined as being in running state, to cyclically transmit the pressure signal at second predetermined time intervals, which are longer than the first predetermined time intervals, when the vehicle is determined as being in brief-stop state, and to refrain from transmitting the pressure signal when the vehicle is determined as being in parking state.

In addition, in the tire pressure monitor according to the present invention, the change in the centrifugal acceleration may be determined as the absolute value of a difference between two values of the centrifugal acceleration. Otherwise, the change in the centrifugal acceleration may alternatively be determined as the absolute value of a differential of the centrifugal acceleration with respect to time for a given time interval.

According to a second aspect of the present invention, there is provided a tire pressure monitoring system which includes a tire pressure monitor, a receiver, and a pressure determiner.

The tire pressure monitor is provided on a wheel of a vehicle to monitor inflation pressure of a tire fitted on the wheel. The tire pressure monitor includes 1) a pressure sensor working to sense the inflation pressure of the tire and output a pressure signal representative of the sensed inflation pressure, 2) a transmitter working to transmit the pressure signal output from the pressure sensor, 3) an acceleration sensor working to sense a centrifugal acceleration, which increases with running speed of the vehicle, and output an acceleration signal representative of the sensed centrifugal acceleration, and 4) a controller working to determine state of motion of the vehicle and control the transmitter to transmit the pressure signal according to the determined state of motion.

The controller is configured to: 1) determine a change in the centrifugal acceleration for a predetermined time period based on the acceleration signal output from the acceleration sensor, 2) determine the vehicle as being in running state when the determined change is greater than or equal to a predetermined threshold, and 3) control the transmitter to transmit the pressure signal when the vehicle is determined as being in running state.

The receiver is provided on a body of the vehicle to receive the pressure signal transmitted from the tire pressure monitor.

The pressure determiner is provided on the body of the vehicle to determine the inflation pressure of the tire based on the pressure signal received by the receiver, According to an embodiment of the invention, the receiver and the pressure determiner are integrated into a central monitor on the body of the vehicle.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-8.

It should be noted that, for the sake of clarity and understanding, identical components having identical functions in different embodiments of the invention have been marked, where possible, with the same reference numerals in each of the figures.

First Embodiment

Figure 1:
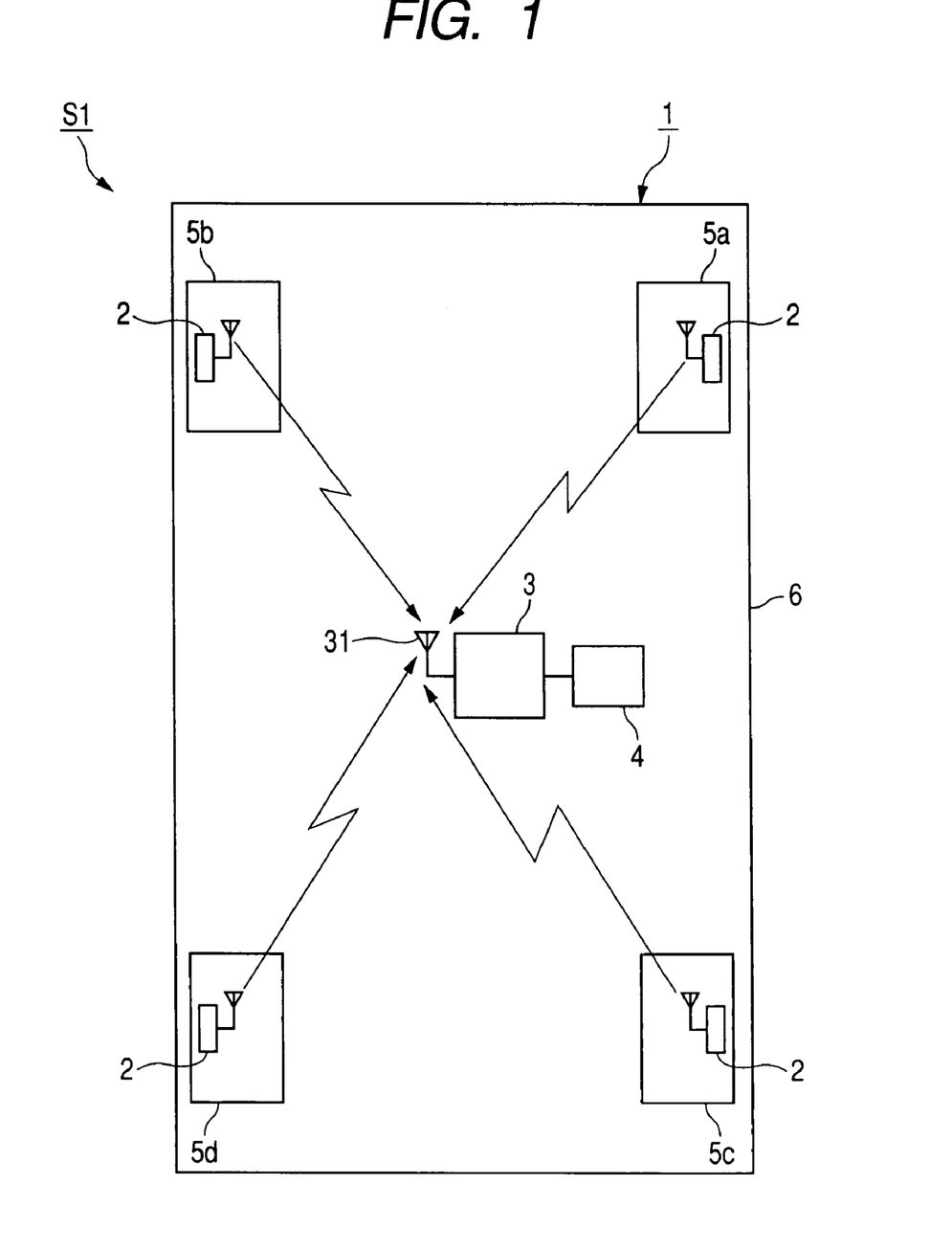
FIG. 1 is a schematic view showing the overall configuration of a tire pressure monitoring system according to the first embodiment of the invention.

FIG. 1 shows the overall configuration of a direct-type tire pressure monitoring system S1 according to the first embodiment of the invention.

The tire pressure monitoring system S1 is installed to a vehicle 1 which includes four wheels 5a-5d (i.e., the FR wheel 5a, the FL wheel 5b, the RR wheel 5c, and the RL wheel 5d) and a body 6.

As shown in FIG. 1, the tire pressure monitoring system S1 includes four tire pressure monitors 2, a central monitor 3, and a warning device 4.

Each of the tire pressure monitors 2 is mounted on a corresponding one of the four wheels 5a-5d of the vehicle 1, so as to have association with a tire fitted on the corresponding wheel. Each of the tire pressure monitors 2 works to sense the inflation pressure of the associated tire and transmit a frame that contains tire pressure information indicative of the sensed inflation pressure of the associated tire.

Figure 2A:
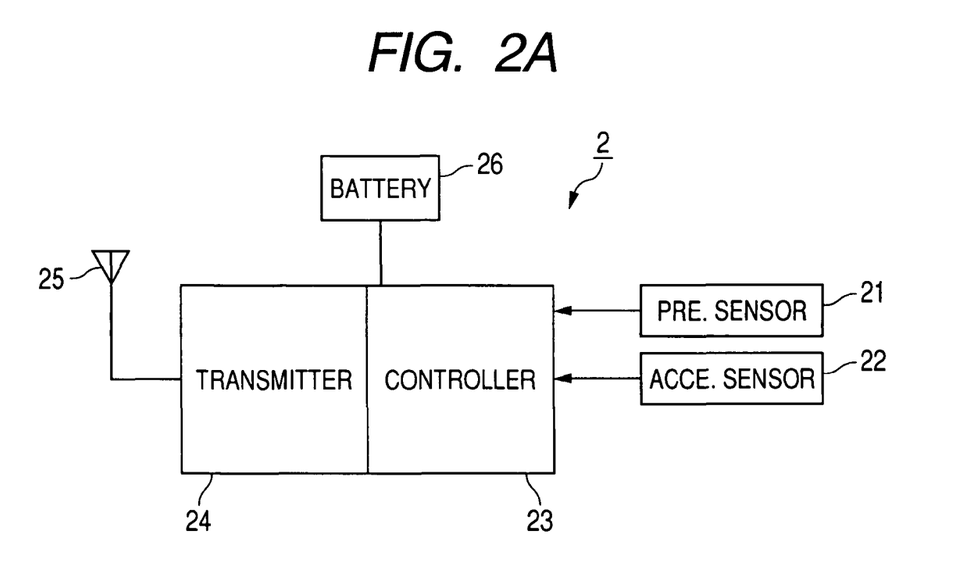
FIG. 2A is a functional block diagram showing the overall configuration of each of tire pressure monitors of the tire pressure monitoring system.

FIG. 2A shows the overall configuration of each of the tire pressure monitors 2. As shown in the figure, each of the tire pressure monitors 2 includes a pressure sensor 21, an acceleration sensor 22, a controller 23, a transmitter 24, an antenna 25, and a battery 26.

The pressure sensor 21 is of, for example, diaphragm type. The pressure sensor 21 works to sense the inflation pressure of the associated tire and output a pressure signal representative of the sensed inflation pressure.

The acceleration sensor 22 is provided in the form of a MEMS (Micro Electro Mechanical System). The acceleration sensor 22 works to sense a centrifugal acceleration G, which is caused by a centrifugal force acting on the tire pressure monitor 2 with rotation of the corresponding wheel, and output an acceleration signal representative of the sensed centrifugal acceleration G.

More specifically, though not graphically shown, the acceleration sensor 22 includes a silicon substrate having a beam formed thereon. With rotation of the corresponding wheel, the beam will be bended, resulting in a change in the electric resistance of an electric circuit formed on the substrate. The change in the electric resistance increases as a function of the centrifugal acceleration G; thus, it is possible to detect the centrifugal acceleration G through detecting the change in the electric resistance.

The controller 23 is configured with a microcomputer of a well-kwon type, which includes a CPU (Central Processing Unit), a ROM (Read Only Memory), a RAM (Random Access Memory), and I/O (Input/Output) devices. It should be noted that in the present embodiment, the RAM is of nonvolatile type.

The controller 23 is configured to implement predetermined processes in accordance with a program installed in the ROM. Further, in the present embodiment, the controller 23 is configured to repeatedly wake up and sleep at predetermined time intervals, so as to save the electric power of the battery 26. The length of each sleeping period between successive two waking-up periods may be set to, for example, 5 s.

More specifically, the controller 23 receives both the pressure signal output from the pressure sensor 21 and the acceleration signal output from the acceleration sensor 22 and processes the received signals as needed. Then, the controller 23 assembles the frame, which contains the tire pressure information indicative of the sensed inflation pressure of the associated tire and ID information indicative of the ID of the tire pressure monitor 2, and sends the frame to the transmitter 24. Further, the controller 23 determines the state of motion of the vehicle 1 based on the acceleration signal and controls the transmitter 24 to transmit the frame according to the determined state of motion.

The transmitter 24 works to transmit the frame, through modulation and at a radio frequency, to the central monitor 3 via the antenna 25.

The battery 26 is provided to supply electric power necessary for operations of the pressure and acceleration sensors 21 and 22, the controller 23, and the transmitter 24.

Each of the above-described tire pressure monitors 2 is fixed to an air valve of the corresponding one of the wheels 5a-5d and at least the pressure sensor 21 thereof is arranged to be exposed to the air within the associated tire.

On the other hand, the central monitor 3 is mounted on the body 6 of the vehicle 1, as shown in FIG. 1. The central monitor 3 works to receive the frames transmitted from the tire pressure monitors 2 and determine the inflation pressures of the four tires based on the tire pressure information contained in the corresponding frames.

Figure 2B:
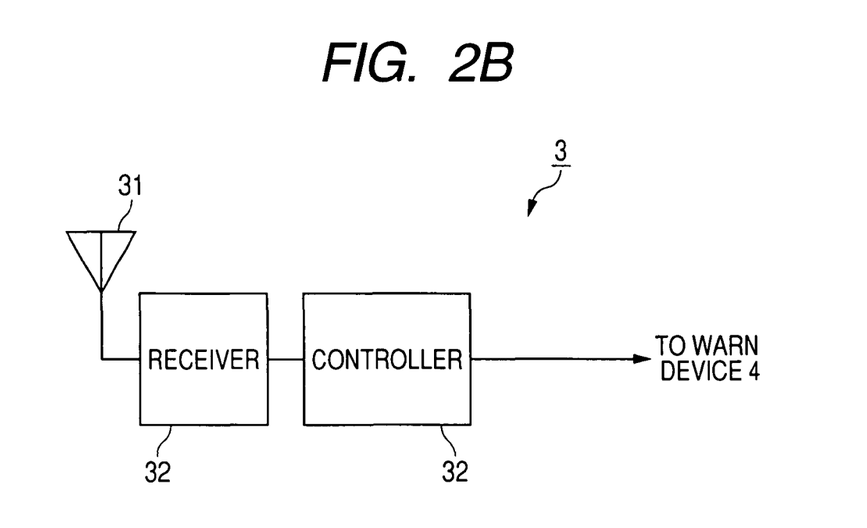
FIG. 2B is a functional block diagram showing the overall configuration of a central monitor of the tire pressure monitoring system.

FIG. 2B shows the overall configuration of the central monitor 3. As shown in the figure, the central monitor 3 includes an antenna 31, a receiver 32, and a controller 33.

In the present embodiment, the single antenna 31 is provided for receiving all the frames transmitted from the tire pressure monitors 2. However, it is also possible for the central monitor 3 to include four antennas 31 each of which is for receiving the frame transmitted from a corresponding one of the tire pressure monitors 2.

The receiver 32 is configured to receive, through demodulation, the frames transmitted from the tire pressure monitors 3 via the antenna 31 and send the received frames to the controller 33.

The controller 33 is configured with a microcomputer of a well-known type, which includes a CPU, a ROM, a RAM, and I/O devices. Further, the controller 33 is configured to implement predetermined processes in accordance with a program installed in the ROM thereof.

More specifically, the controller 33 receives the frames sent from the receiver 32 and identifies, for each of the frames, the tire pressure monitor 2 which has transmitted the frame based on the ID information contained in the frame. Then, the controller 33 determines the inflation pressures of the four tires based on the tire pressure information contained in the corresponding frames. After that, the controller 33 compares each of the determined inflation pressures of the tires with a predetermined pressure threshold and outputs a warning signal when it is lower than the predetermined pressure threshold.

The warning device 4 is, as illustrated in FIG. 1, electrically connected to the central monitor 3 and arranged in a location visible for the driver of the vehicle 1. The warning device 4 is configured with, for example, a warning display arranged on the instrument panel of the vehicle 1. The warning device 4 works to inform, in response to receipt of the warning signal output from the central monitor 3, the driver of a decrease in the inflation pressures of the tires.

Figure 3:
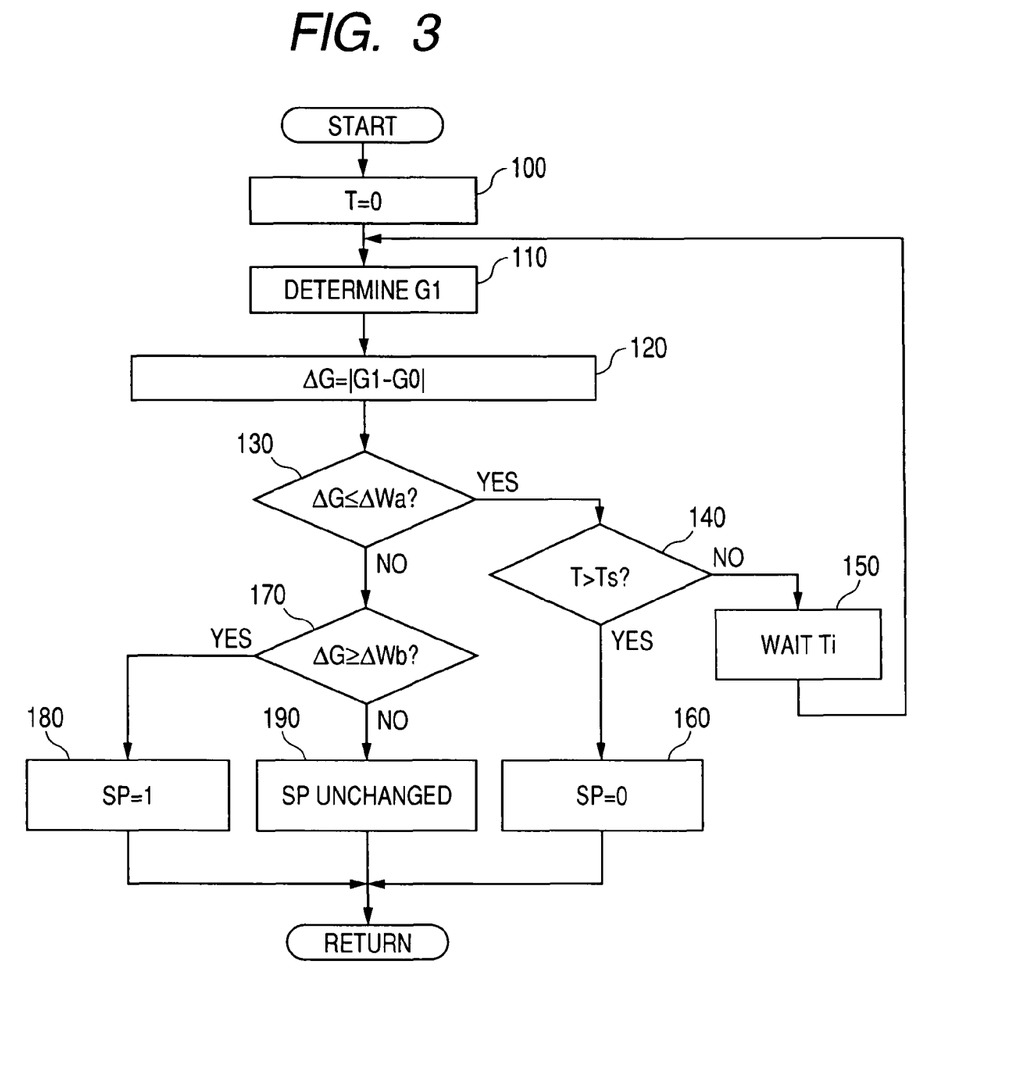
FIG. 3 is a flow chart showing a process of a controller of each of the tire pressure monitors for determining the state of motion of a vehicle on which the tire pressure monitoring system is installed.

FIG. 3 illustrates a process of the controller 23 of each of the tire pressure monitors 2 for determining the state of motion of the vehicle 1. This process is configured to start immediately after each waking-up of the controller 23.

First, at the step 100, the count time T of a timer (not shown) of the controller 23 is set to zero.

At the step 110, the controller 23 determines a present value G1 of the centrifugal acceleration based on the acceleration signal output from the acceleration sensor 22.

At the step 120, a change ΔG in the centrifugal acceleration is determined. More specifically, in the present embodiment, the controller 23 determines the change ΔG as the absolute value of the difference between the present value G1 and a previous value G0 of the centrifugal acceleration. The previous value G0 is previously stored in the nonvolatile RAM of the controller 23.

At the step 130, a determination is made as to whether the change ΔG is less than or equal to a tolerance ΔWa.

In the present embodiment, the tolerance ΔWa represents an allowable upper limit of change in the determined centrifugal acceleration G when the vehicle 1 is in stop state. Both the actual centrifugal acceleration G and the actual change in the centrifugal acceleration G are equal to zero when the vehicle 1 is in stop state; however, due to the accuracy tolerance of the acceleration sensor 22 and errors occurring in signal processing of the controller 23, the determined centrifugal acceleration G may vary even when the vehicle 1 is in stop state.

If the determination at the step 130 produces a "YES" answer, then the process proceeds to the step 140.

At the step 140, a further determination is made as to whether the count time T of the timer exceeds a time limit Ts. In the present embodiment, the time limit Ts is set to, for example, 5 minutes.

If the determination at the step 140 produces a "YES" answer, then the process proceeds to the step 160.

At the step 160, the vehicle 1 is determined as being in stop state and the value of a state parameter SP is set to 0 (zero). Then, the process goes to the end.

Here, the state parameter SP is used to indicate the state of motion of the vehicle 1. More specifically, the values 0 and 1 of the state parameter SP respectively represent stop and running states of the vehicle 1. The value of the state parameter SP is stored in the nonvolatile RAM of the controller 23. Therefore, even if the controller 23 changes its operation to sleep, the value of SP will be kept in the RAM during the sleeping period.

In the present embodiment, when the vehicle 1 is determined as being in stop state, the controller 23 controls the transmitter 24 to refrain from transmitting the pressure signal, so as to save the electric power of the battery 26.

Otherwise, if the determination at the step 140 produces a "NO" answer, then the process proceeds to the step 150.

At the step 150, the controller 23 waits for a predetermined time period Ti and updates the previous value G0 with the present value G1 of the centrifugal acceleration. Then, the process returns to the step 110.

On the other hand, if the determination at the step 130 produces a "NO" answer, then the process goes on to the step 170.

At the step 170, a further determination is made as to whether the change ΔG is greater than or equal to a predetermined threshold ΔWb which is greater than the tolerance ΔWa.

If the determination at the step 170 produces a "YES" answer, then the process proceeds to the step 180.

At the step 180, the vehicle 1 is determined as being in running state and the value of the state parameter SP is set to 1. Then, the process goes to the end.

In the present embodiment, when the vehicle 1 is determined as being in running step, the controller 23 controls the transmitter 24 to cyclically transmit the pressure signal at predetermined time intervals (e.g., 1 minute).

Otherwise, if the determination at the step 170 produces a "NO" answer, then the process proceeds to the step 190.

At the step 190, the controller 23 refrains from newly determining whether the vehicle 1 is in running or stop state and keeps the value of the state parameter SP unchanged. In other words, the controller 23 maintains the result of the last determination as to whether the vehicle 1 is in running or stop state. Then, the process goes to end.

As above, in the tire pressure monitoring system S1 according to the present embodiment, the controller 23 of each of the tire pressure monitors 2 first determines the change ΔG in the centrifugal acceleration and then determines the state of motion of the vehicle 1 using the change ΔG.

Since the centrifugal acceleration G definitely changes with the running speed V of the vehicle 1, it is possible for the controller 23 to accurately determine, using the change ΔG, the state of motion of the vehicle 1 even when the vehicle 1 starts running at low speeds.

Figure 4:
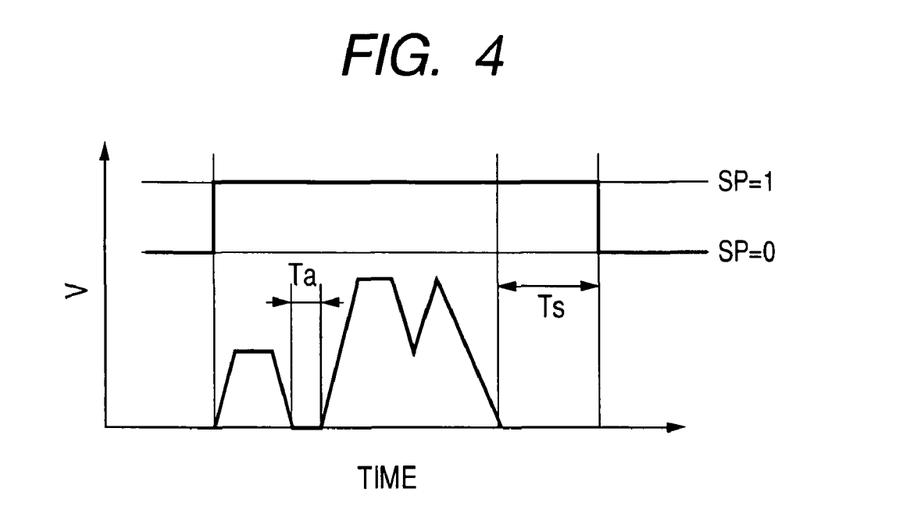
FIG. 4 is a time chart illustrating an example of accurate determination by the process of FIG. 3.

FIG. 4 illustrates an example of the above determination according to the present embodiment. As shown in the figure, the vehicle 1 can be accurately determined as being in running state even when it is running at a low speed. Further, when the vehicle 1 makes a brief-stop for a time period Ta for waiting for a traffic light, the vehicle 1 is still determined as being in running state since the time period Ta is shorter than the time limit Ts. Thus, it is still possible for the pressure signal to be transmitted during such a brief-stop period.

Accordingly, in the tire pressure monitoring system S1, each of the tire pressure monitors 2 can accurately determine the state of motion of vehicle 1 and transmit the pressure signal according to the detected state of motion, thereby effectively saving the electric power of the battery 26.

Second Embodiment

Figure 5:
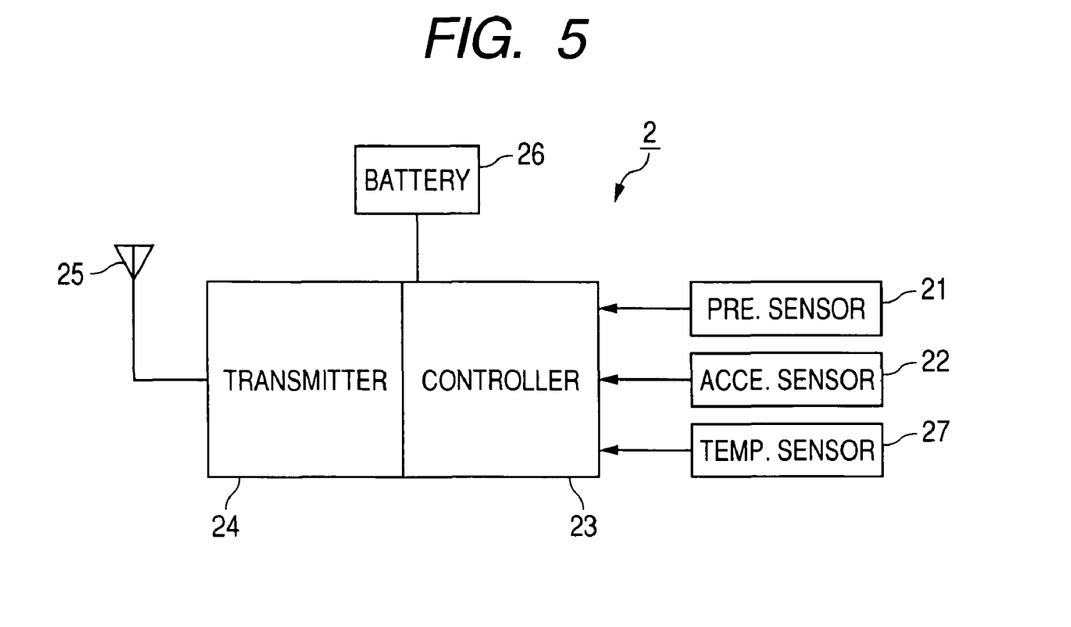
FIG. 5 is a functional block diagram showing the overall configuration of each of the tire pressure monitors according to the second embodiment of the invention.

FIG. 5 shows the overall configuration of each of the tire pressure monitors 2 according to the second embodiment of the invention.

As shown in FIG. 5, in the present embodiment, each of the tire pressure monitors 2 further includes a temperature senor 27 that works to sense the temperature of air within the associated tire and output a temperature signal representative of the sensed temperature.

Figure 6:
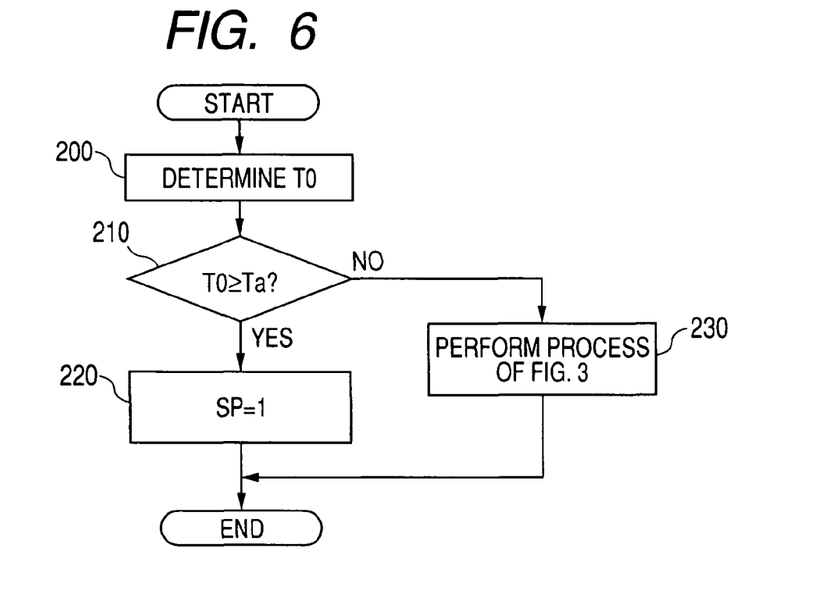
FIG. 6 is a flow chart showing a process of the controller of each of the tire pressure monitors for determining the state of motion of the vehicle according to the second embodiment of invention.

FIG. 6 shows a process of the controller 23 of each of the tire pressure monitors 2 for determining the state of motion of the vehicle 1 according to the present embodiment.

As shown in FIG. 6, this process incorporates therein the process of FIG. 3 described in the previous embodiment. Further, this process is configured to start immediately after each waking-up of the controller 23.

First, at the step 200, the controller 23 determines the temperature T0 of air within the associated tire based on the temperature signal output from the temperature sensor 27.

Then, at the step 210, the controller 23 determines whether the determined temperature T0 is higher than or equal to a predetermined temperature threshold Ta.

Here, the temperature threshold Ta is predetermined so as to be equal to an upper limit of temperatures of air within the tires when the vehicle 1 is in normal running state. The upper limit may be, for example, 90° C.

If the determination at the step 210 produces a "YES" answer, then the process proceeds to the step 220.

At the step 220, the vehicle 1 is determined as being in running state and the value of the state parameter SP is set to 1. Then, the process goes to end.

Consequently, the controller 23 controls the transmitter 24 to cyclically transmit the pressure signal at the predetermined time intervals.

More specifically, in this case, the temperature T0 higher than Ta indicates that the tire is in an abnormal state. Accordingly, the controller 23 controls the transmitter 24 to immediately transmit the pressure signal, without performing any further determinations, thereby timely informing the driver of the abnormal state of the tire.

Otherwise, if the determination at the step 210 produces a "NO" answer, then the process goes on to the step 230.

At the step 230, the controller 23 performs the process of FIG. 3. Then, the process goes to the end.

As above, in the present embodiment, the controller 23 of each of the tire pressure monitors 2 determines, prior to determining the state of motion of the vehicle 1 based on the change ΔG in the centrifugal acceleration, the vehicle 1 as being in running state when the temperature T0 is higher than or equal to Ta.

When the temperature T0 is so high as to exceed Ta, the sensing accuracy of the acceleration sensor 22 will be considerably decreased. Consequently, it will be difficult to accurately determine the state of motion of the vehicle 1 based on the change ΔG in the centrifugal acceleration sensed by the acceleration sensor 22, and thus difficult to reliably transmit the pressure signal according to the state of motion of the vehicle 1. However, through performing the above process according to the present embodiment, it is possible to transmit the pressure signal in a timely manner to inform the driver of the abnormal state of the tire, without being influenced by the decreased sensing accuracy of the acceleration sensor 22.

Third Embodiment

Figure 7:
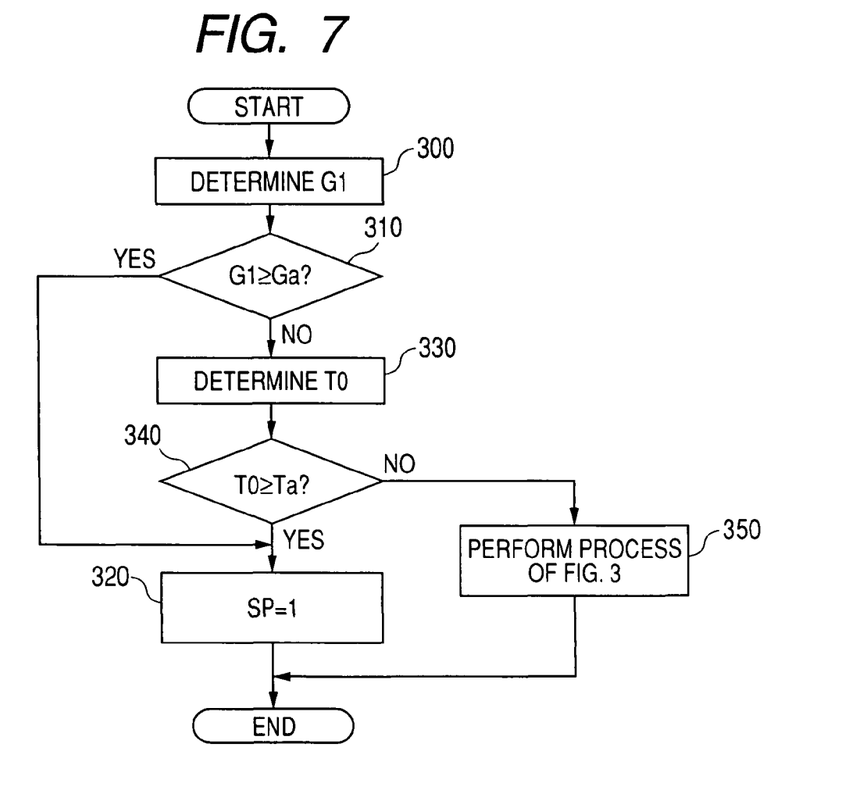
FIG. 7 is a flow chart showing a process of the controller of each of the tire pressure monitors for determining the state of motion of the vehicle according to the third embodiment of invention.

FIG. 7 shows a process of the controller 23 of each of the tire pressure monitors 2 for determining the state of motion of the vehicle 1 according to the third embodiment of the invention.

As shown in FIG. 7, this process incorporates therein the process of FIG. 3 described in the first embodiment. Further, this process is configured to start immediately after each waking-up of the controller 23.

First, at the step 300, the controller 23 determines a present value G1 of the centrifugal acceleration based on the acceleration signal output from the acceleration sensor 22.

At the step 310, a determination is made as to whether the present value G1 is greater than or equal to a predetermined acceleration threshold Ga.

Here, the acceleration threshold Ga is predetermined so as to be equal to the value of the centrifugal acceleration G when the vehicle 1 runs at a high speed (e.g., 50 km/h).

If the determination at the step 310 produces a "YES" answer, then the process proceeds to the step 320.

At the step 320, the vehicle 1 is determined as being in running state and the value of the state parameter SP is set to 1. Then, the process goes to the end.

Consequently, the controller 23 controls the transmitter 24 to cyclically transmit the pressure signal at the predetermined time intervals.

More specifically, in this case, the present value G1 higher than Ga indicates that the vehicle 1 is definitely in running state. Accordingly, the controller 23 controls the transmitter 24 to immediately transmit the pressure signal, without performing any further determinations, thereby saving the electric power of the battery 26.

Otherwise, if the determination at the step 310 produces a "NO" answer, then the process proceeds to the step 330.

At the succeeding steps 330 through 350, the controller 23 performs the same process as at the steps 200, 210, and 230 of FIG. 6 described in the previous embodiment. Then, the process goes to the end.

As above, in the present embodiment, the controller 23 of each of the tire pressure monitors 2 determines, prior to determining the state of motion of the vehicle 1 based on the temperature Ta and the change $\Delta G$ in the centrifugal acceleration, the vehicle 1 as being in running state when the present value G1 of the centrifugal acceleration is greater than or equal to Ga.

When the vehicle 1 is running in auto-cruise mode at a constant speed on an uncrowded highway, the change $\Delta G$ in the centrifugal acceleration is almost zero. Thus, if the state of motion of the vehicle 1 was determined based on the change $\Delta G$ in the centrifugal acceleration, the vehicle 1 would be determined as being in stop state. However, through performing the above process according to the present embodiment, it is still possible to accurately determine the vehicle 1 as being in running state.

Fourth Embodiment

Figure 8:
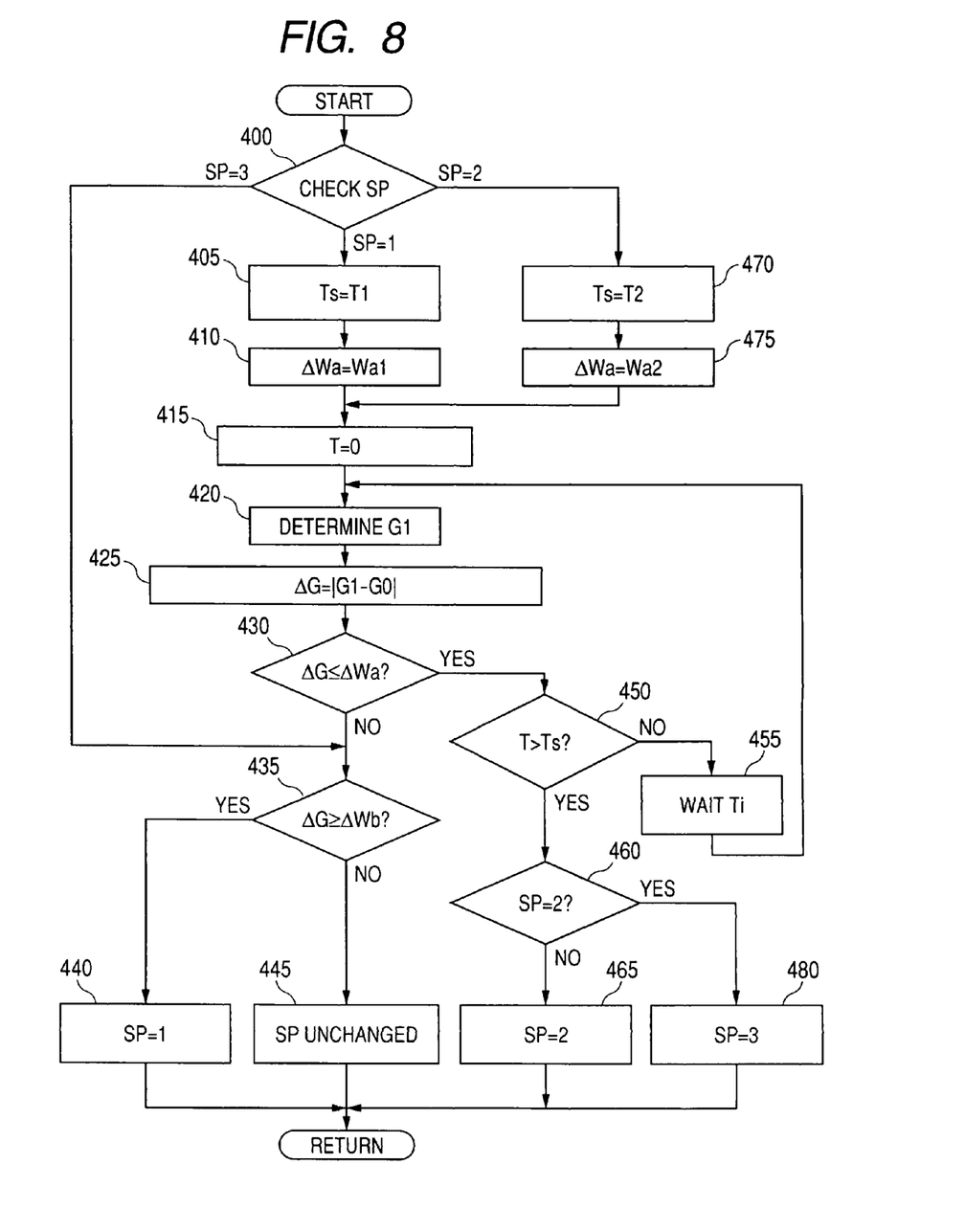
FIG. 8 is a flow chart showing a process of the controller of each of the tire pressure monitors for determining the state of motion of the vehicle according to the fourth embodiment of invention.

This embodiment illustrates a process of the controller 23 of each of the tire pressure monitors 2 for determining the state of motion of the vehicle 1, which is configured to further distinguish two different types of stop states. One type is brief-stop state where the driver remains on the vehicle 1; the other type is parking state where there is nobody on the vehicle 1.

FIG. 8 shows the process according to the present embodiment. This process is configured to start immediately after each waking-up of the controller 23.

First, at the step 400, the present value of the state parameter SP is checked.

In the present embodiment, the values 1, 2, and 3 of the state parameter SP respectively represent running, brief-stop, and parking states of the vehicle 1.

If the present value of SP checked at the step 400 is equal to 1, in other words, if the vehicle 1 was determined as being in running state in the last determination, then the process proceeds to the step 405.

At the step 405, the time limit Ts of the timer of the controller 23 is set to a first time T1. The first time T1 represents a possible brief-stop time of the vehicle 1 and is preset to, for example, 1 minute.

At the step 410, the tolerance $\Delta Wa$ is set to a first tolerance $\Delta Wa1$.

In the present embodiment, the first tolerance $\Delta Wa1$ represents an allowable upper limit of change in the determined centrifugal acceleration G when the vehicle 1 is in brief-stop state. The first tolerance $\Delta Wa1$ is preset to, for example, 1 G.

Then, at the step 415, the count time T of the timer is set to zero.

At the step 420, the controller 23 determines a present value G1 of the centrifugal acceleration based on the acceleration signal output from the acceleration sensor 22.

At the step 425, a change $\Delta G$ in the centrifugal acceleration G is determined.

In the present embodiment, the change $\Delta G$ is determined as the absolute value of the difference between the present value G1 and a previous value G0 of the centrifugal acceleration G, as in the first embodiment.

At the step 430, a determination is made as to whether the change $\Delta G$ is less than or equal to the tolerance $\Delta Wa$.

If the determination at the step 430 produces a "NO" answer, then the process proceeds to the step 435.

At the step 435, a further determination is made as to whether the change $\Delta G$ is greater than or equal to the predetermined threshold $\Delta Wb$ which is greater than $\Delta Wa1$.

If the determination at the step 435 produces a "YES" answer, then the process proceeds to the step 440.

At the step 440, the vehicle 1 is determined as being in running state and the value of the state parameter SP is set to 1. Then, the process goes to the end.

In the present embodiment, when the vehicle 1 is determined as being in running state, the controller 23 controls the transmitter 24 to cyclically transmit the pressure signal at first predetermined time intervals (e.g., 1 minute).

Otherwise, if the determination at the step 435 produces a "NO" answer, then the process proceeds to the step 445.

At the step 445, the controller 23 refrains from newly determining the state of motion of the vehicle 1 and keeps the value of the state parameter SP unchanged. In other words, the controller 23 maintains the result of the last determination as to the state of motion of the vehicle 1. Then, the process goes to end.

On the other hand, if the determination at the step 430 produces a "YES" answer, then the process proceeds to the step 450.

At the step 450, a further determination is made as to whether the count time T of the timer exceeds the time limit Ts.

If the determination at the step 450 produces a "NO" answer, then the process proceeds to the step 455.

At the step 455, the controller 23 waits for the predetermined time period Ti and updates the previous value G0 with the present value G1 of the centrifugal acceleration. Then, the process returns to the step 420.

Otherwise, if the determination at the step 450 produces a "YES" answer, then the process proceeds to the step 460.

At the step 460, a check is made as to whether the present value of the state parameter SP is equal to 2.

If the check at the step 460 produces a "NO" answer, in other words, if the vehicle 1 was determined as being not in brief-stop state in the last determination, then the process proceeds to the step 465.

At the step 465, the vehicle 1 is determined as being in brief-stop state and the value of the state parameter SP is set to 2. Then, the process goes to the end.

In the present embodiment, when the vehicle 1 is determined as being in brief-stop state, the controller 23 controls the transmitter 24 to cyclically transmit the pressure signal at second predetermined time intervals (e.g., 2 minutes), which are longer than the first predetermined time intervals.

Otherwise, if the check at the step 460 produces a "YES" answer, in other words, if the vehicle 1 was determined as being in brief-stop state in the last determination, then the process proceeds to the step 480.

At the step 480, the vehicle 1 is determined as being in parking state and the value of the state parameter SP is set to 3. Then, the process goes to the end.

In the present embodiment, when the vehicle 1 is determined as being in parking state, the controller 23 controls the transmitter 24 to refrain from transmitting the pressure signal, so as to save the electric power of the battery 26.

Turning back to the step 400, if the present value of SP is equal to 2, in other words, if the vehicle 1 was determined as being in brief-stop state in the last determination, then the process proceeds to the step 470.

At the step 470, the time limit Ts of the timer is set to a second time T2. The second time T2 represents a possible parking time of the vehicle 1 and is preset to, for example, 5 minutes.

At the step 475, the tolerance $\Delta$Wa is set to a second tolerance $\Delta$Wa2. Then, the process goes on to the step 415.

In the present embodiment, the second tolerance $\Delta$Wa2 represents an allowable upper limit of change in the determined centrifugal acceleration G when the vehicle 1 is in parking state. The second tolerance $\Delta$Wa2 is preset to, for example, 0.5 G, which is less than the first tolerance $\Delta$Wa1 of 1 G.

Turning back again to the step 400, if the present value of SP is equal to 3, in other words, if the vehicle 1 was determined as being in parking state in the last determination, then the process directly proceeds to the step 435.

As above, in the present embodiment, the controller 23 determines the state of motion of the vehicle 1 in two stages. In the first stage, the controller 23 determines whether the vehicle 1 is in running or brief-stop state. When the vehicle 1 is determined as being in brief-stop state in the first stage, the controller 23 further determines in the second stage whether the vehicle 1 is in running, brief-stop, or parking state. Further, the controller 23 controls the transmitter 24 to: 1) cyclically transmit the pressure signal at the first predetermined time intervals when the vehicle 1 is determined as being in running state, 2) cyclically transmit the pressure signal at the second predetermined time intervals, which are longer than the first predetermined time intervals, when the vehicle 1 is determined as being in brief-stop state, and 3) refrain from transmitting the pressure signal when the vehicle 1 is determined in parking state.

With the above configuration, it is possible for each of the tire pressure monitors 2 to timely inform the driver of the inflation pressure of the associated tire while effectively saving the electric power of the battery 26.

Other Embodiments

While the above particular embodiments of the invention have been shown and described, it will be understood by those who practice the invention and those skilled in the art that various modifications, changes, and improvements may be made to the invention without departing from the spirit of the disclosed concept.

1) In the previous embodiments, the controller 23 of each of the tire pressure monitors 2 may further be configured to:
store in the nonvolatile RAM the present value G1 of the centrifugal acceleration as a deviation G0 of the acceleration sensor 22 when the vehicle 1 is determined as being in stop state,
correct the subsequently determined values of the centrifugal acceleration using the deviation G0, and
make the subsequent determinations using the corrected values of the centrifugal acceleration.

With the above configuration, it is possible to eliminate the influence of the aged deterioration of the acceleration sensor 22 on the sensing accuracy of the same, thereby improving accuracy in determining the state of the motion of the vehicle 1.

2) Though the change $\Delta$G in the centrifugal acceleration is determined as the absolute value of the difference between the present and previous values G1 and G0 of the centrifugal acceleration in the previous embodiments, it may also be determined in various other ways.

For example, the change $\Delta$G may be determined as the absolute value of the difference between a present average A1 and a previous average A0 of the centrifugal acceleration. The present average A1 is obtained by averaging a first group of values of the centrifugal acceleration. The previous average A0 is obtained by averaging a second group of values of the centrifugal acceleration. The second group of values is determined prior to the first group of values.

Alternatively, the change $\Delta$G may be determined as the absolute value of the difference between a present moving average MA1 and a previous moving average MA0 of the centrifugal acceleration. The previous moving average MA0 is determined prior to the present moving average MA1.

It is also possible to determine the change $\Delta$G as the absolute value of the difference between the present average A1 and the previous moving average MV0.

Further, the change $\Delta$G may alternatively be determined as the absolute value of a differential of the centrifugal acceleration with respect to time for a given time interval.

3) The processes of determining the state of motion of the vehicle 1 according to the previous embodiments may be modified in any possible ways.

For example, the process of FIG. 3 may be modified to include the steps 300 and 310 of the process of FIG. 7 before the step 100.

Such modifications, changes, and improvements within the skill of the art are intended to be covered by the appended claims.

What is claimed is:

1. A tire pressure monitor, which is provided on a wheel of a vehicle to monitor inflation pressure of a tire fitted on the wheel, said tire pressure monitor comprising:
  a pressure sensor working to sense the inflation pressure of the tire and output a pressure signal representative of the sensed inflation pressure;
  a transmitter working to transmit the pressure signal output from the pressure sensor;
  an acceleration sensor working to sense a centrifugal acceleration, which increases with running speed of the vehicle, and output an acceleration signal representative of the sensed centrifugal acceleration; and
  a controller working to determine state of motion of the vehicle and control the transmitter to transmit the pressure signal according to the determined state of motion,
  wherein the controller is configured to:
  determine a change in the centrifugal acceleration for a predetermined time period based on the acceleration signal output from the acceleration sensor,
  determine the vehicle as being in running state when the determined change is greater than or equal to a predetermined threshold, and
  control the transmitter to transmit the pressure signal when the vehicle is determined as being in running state.

2. The tire pressure monitor as set forth in claim 1, wherein the controller is further configured to:

determine the vehicle as being in stop state when the change in the centrifugal acceleration is less than or equal to a predetermined tolerance which is less than the predetermined threshold, and control the transmitter to refrain from transmitting the pressure signal when the vehicle is determined as being in stop state.

3. The tire pressure monitor as set forth in claim 2, further comprising a memory storing therein a state parameter indicative of the state of motion of the vehicle, wherein the controller is further configured to repeat determination of the state of motion of the vehicle and update the state parameter in the memory based on the result of each the determination, and wherein when the change in the centrifugal acceleration is less than the predetermined threshold and greater than the predetermined tolerance, the controller refrains from newly determining the state of motion of the vehicle and keeps the state parameter unchanged.

4. The tire pressure monitor as set forth in claim 3, wherein the memory is a nonvolatile memory.

5. The tire pressure monitor as set forth in claim 1, further comprising a temperature sensor that works to sense temperature of air within the tire and output a temperature signal representative of the sensed temperature, wherein the controller is further configured to:

determine the temperature of air within the tire based on the temperature signal output from the temperature sensor, and determine, before determining the state of motion of the vehicle based on the change in the centrifugal acceleration, the vehicle as being in running state when the determined temperature is higher than or equal to a predetermined temperature threshold.

6. The tire pressure monitor as set forth in claim 5, wherein the controller is further configured to:

determine the centrifugal acceleration based on the acceleration signal output from the acceleration sensor, and determine, before determining the state of motion of the vehicle based on the temperature of air within the tire, the vehicle as being in running state when the determined centrifugal acceleration is higher than or equal to a predetermined acceleration threshold.

7. The tire pressure monitor as set forth in claim 6, further comprising a nonvolatile memory storing therein a deviation of the acceleration sensor, wherein the controller is further configured to:

correct the determined centrifugal acceleration and the determined change in the centrifugal acceleration using the deviation of the acceleration sensor, and determine the state of motion of the vehicle based on the corrected centrifugal acceleration and the corrected change in the centrifugal acceleration.

8. The tire pressure monitor as set forth in claim 7, wherein when the vehicle is determined as being in stop state, the controller sets the deviation of the acceleration sensor to a present value of the centrifugal acceleration.

9. The tire pressure monitor as set forth in claim 1, wherein the controller is further configured to:

determine the centrifugal acceleration based on the acceleration signal output from the acceleration sensor, and determine, before determining the state of motion of the vehicle based on the change in the centrifugal acceleration, the vehicle as being in running state when the determined centrifugal acceleration is higher than or equal to a predetermined acceleration threshold.

10. The tire pressure monitor as set forth in claim 9, further comprising a nonvolatile memory storing therein a deviation of the acceleration sensor, wherein the controller is further configured to:

correct the determined centrifugal acceleration and the determined change in the centrifugal acceleration using the deviation of the acceleration sensor, and determine the state of motion of the vehicle based on the corrected centrifugal acceleration and the corrected change in the centrifugal acceleration.

11. The tire pressure monitor as set forth in claim 10, wherein when the vehicle is determined as being in stop state, the controller sets the deviation of the acceleration sensor to a present value of the centrifugal acceleration.

12. The tire pressure monitor as set forth in claim 1, further comprising a nonvolatile memory storing therein a deviation of the acceleration sensor, wherein the controller is further configured to:

correct the determined change in the centrifugal acceleration using deviation of the acceleration sensor, and determine the state of motion of the vehicle based on the corrected change in the centrifugal acceleration.

13. The tire pressure monitor as set forth in claim 12, wherein when the vehicle is determined as being in stop state, the controller sets the deviation of the acceleration sensor to a present value of the centrifugal acceleration.

14. The tire pressure monitor as set forth in claim 1, wherein the controller is further configured to:

determine the vehicle as being in brief-stop state when the change in the centrifugal acceleration is less than or equal to a first predetermined tolerance which is less than the predetermined threshold, determine, when the vehicle is determined as being in brief-stop state, a second change in the centrifugal acceleration for a second predetermined time period based on the acceleration signal output from the acceleration sensor, the second predetermined time period being longer than the first predetermined time period, further determine the vehicle as being in parking state when the second change is less than or equal to a second predetermined tolerance which is less than the first predetermined tolerance, as being in running state when the second change is greater than or equal to the predetermined threshold, and as being in brief-stop state when the second change is greater than the second predetermined tolerance and less than the predetermined threshold, and control the transmitter to cyclically transmit the pressure signal at first predetermined time intervals when the vehicle is determined as being in running state, to cyclically transmit the pressure signal at second predetermined time intervals, which are longer than the first predetermined time intervals, when the vehicle is determined as being in brief-stop state, and to refrain from transmitting the pressure signal when the vehicle is determined as being in parking state.

15. The tire pressure monitor as set forth in claim 1, wherein the change in the centrifugal acceleration is determined as the absolute value of a difference between two values of the centrifugal acceleration.

16. The tire pressure monitor as set forth in claim 1, wherein the change in the centrifugal acceleration is determined as the absolute value of a differential of the centrifugal acceleration with respect to time for a given time interval.

17. A tire pressure monitoring system comprising:

a tire pressure monitor provided on a wheel of a vehicle to monitor inflation pressure of a tire fitted on the wheel, the tire pressure monitor including
1) a pressure sensor working to sense the inflation pressure of the tire and output a pressure signal representative of the sensed inflation pressure,
2) a transmitter working to transmit the pressure signal output from the pressure sensor;
3) an acceleration sensor working to sense a centrifugal acceleration, which increases with running speed of the vehicle, and output an acceleration signal representative of the sensed centrifugal acceleration, and
4) a controller working to determine state of motion of the vehicle and control the transmitter to transmit the pressure signal according to the determined state of motion;
a receiver provided on a body of the vehicle to receive the pressure signal transmitted from the tire pressure monitor; and a pressure determiner provided on the body of the vehicle to determine the inflation pressure of the tire based on the pressure signal received by the receiver,
wherein the controller of the tire pressure monitor is configured to:
determine a change in the centrifugal acceleration for a predetermined time period based on the acceleration signal output from the acceleration sensor,
determine the vehicle as being in running state when the determined change is greater than or equal to a predetermined threshold, and
control the transmitter to transmit the pressure signal when the vehicle is determined as being in running state.

18. The tire pressure monitoring system as set forth in claim 17, wherein the receiver and the pressure determiner are integrated into a central monitor on the body of the vehicle.

* * * * *